United States Patent [19]
Vigil et al.

[11] Patent Number: 5,557,550
[45] Date of Patent: Sep. 17, 1996

[54] JUNCTION TEMPERATURE STATUS SENSING AND REDUCTION FOR INTEGRATED POWER DEVICES, SUCH AS A HEAD POSITIONING SYSTEM IN A MAGNETIC DISC DRIVE

[75] Inventors: Daniel R. Vigil, Agoura Hills; LeRoy A. Volz, Northridge, both of Calif.

[73] Assignee: Seagate Technology, Inc., Scotts Valley, Calif.

[21] Appl. No.: 212,201

[22] Filed: Mar. 11, 1994

[51] Int. Cl.$^6$ .............................. H02H 9/00; G08B 21/00
[52] U.S. Cl. ........................ 364/557; 340/584; 340/653; 361/94
[58] Field of Search ................................ 340/584, 653; 360/75; 361/93, 94; 364/557

[56] References Cited

U.S. PATENT DOCUMENTS

| Re. 30,839 | 12/1981 | Miyamoto | 327/229 |
|---|---|---|---|
| 3,431,486 | 3/1969 | Fruehling et al. | 361/18 X |
| 3,480,852 | 11/1969 | Hung | 323/279 |
| 3,544,846 | 12/1970 | Thompson | 361/94 |
| 4,092,693 | 5/1978 | Ishikawa et al. | 361/103 |
| 4,907,108 | 3/1990 | Masuyama | 360/78.04 |
| 4,970,497 | 11/1990 | Broadwater et al. | 340/598 |

FOREIGN PATENT DOCUMENTS

| 2710762 | 9/1977 | Germany . |
|---|---|---|
| 0031678 | 7/1981 | Germany . |
| 55-049964 | 4/1980 | Japan . |
| 57-180396 | 11/1982 | Japan . |
| 63-269376 | 11/1988 | Japan . |
| 1039674 | 2/1989 | Japan . |
| 3290880 | 12/1991 | Japan . |

Primary Examiner—Edward R. Cosimano
Attorney, Agent, or Firm—Flehr, Hohbach, Test, Albritton & Herbert

[57] ABSTRACT

Junction overheating in an actuator controller IC used to position read/write heads in a magnetic disc storage device is prevented by temporarily decreasing actuator controller IC output signal duty cycle when excessive junction temperature is present. The present invention includes means for monitoring and comparing actuator controller IC junction temperature to a reference temperature, and for outputting a warning signal when junction temperature exceeds the reference temperature by too large a margin. The present invention introduces a time delay into the output signal from the actuator controller IC when the warning signal is present. The time delay may be fixed or variable in duration, and may be varied progressively in duration. The time delay may be generated using circuitry, software, firmware, or a combination thereof.

13 Claims, 5 Drawing Sheets

JUNCTION TEMPERATURE STATUS SENSING AND REDUCTION FOR INTEGRATED POWER DEVICES, SUCH AS A HEAD POSITIONING SYSTEM IN A MAGNETIC DISC DRIVE

FIELD OF THE INVENTION

The invention relates to temperature sensing in integrated power devices in general, and more specifically to junction temperature status sensing in an actuator controller used to read/write heads in a magnetic disc storage unit.

BACKGROUND OF THE INVENTION

The preferred embodiment of the present invention is used to intelligently manage junction temperature in a actuator controller that positions the read/write heads (or transducers) in a magnetic disc drive. For that reason, the background of this invention will be described with respect to temperature monitoring such controllers. However, the present invention may be used to monitor and control junction temperature in other systems as well.

As shown by FIG. 1, a conventional magnetic disc storage system 2 includes one or more magnetic storage platters or discs 4, 6 that are rotated by a spindle motor 8. Discs 4, 6 have respective upper and lower surfaces 4U, 4L, 6U, 6L upon which data may be magnetically written or read. Projecting arms of an actuator assembly 10 carry read/write heads (hereafter "heads" or "transducers") 12U, 12L, 14U, 14L that respectively read and/or write data from disc surfaces 4U, 4L, 6U, 6L. Actuator assembly 10 moves all heads radially under command of a positioning servo controller system 16. A flexible multiconductor cable (not shown) couples the actuator assembly 10 to the servo controller system 16. Of course, disc storage assembly 2 is contained in a suitably sealed protective housing (not shown). Controller system 16 typically includes at least one integrated circuit ("IC") 30, whose junction temperature must not be permitted to exceed a threshold level for too long a period of time.

The various surfaces of discs 4, 6 are commonly formatted into concentric tracks, T1, T2, T3, etc., portions of which are defined as pie-shaped wedges or sectors, e.g., S1, S2, etc. As such, the various disc storage locations may be defined by disc number (e.g., disc 4), disc surface (e.g., 4U), track (or cylinder) number (e.g., T3) and sector number (e.g., sector S1).

Disc system 2 is coupled via a suitable interface to a host computer (not shown). In response to commands issued by the host computer user, or by a program under execution by the host computer, an appropriate disc drive interface command is issued. For example, one such command may require the servo controller 16 to seek data or a storage location on one of the surfaces of a disc, e.g., disc 4, surface 4U, track T3, sector S2.

In response to the command, servo controller system 16 actuates assembly 10 in a controlled fashion. Assembly 10 moves heads 12U, 12L, 14U, 14L in unison over the disc surfaces until the heads are positioned over the desired target track, T3 in the example at hand. Since all heads on the carriage move together, system 2 includes control circuitry to select the proper read/write head to perform the desired data transfer function, head 12U in the present example. Typically system 2 accesses data from the target location within perhaps ten milliseconds.

Some storage systems provide a dedicated disc surface upon which positional information is permanently pre-recorded or embedded for use by servo system 16, for example surface 4U. By demodulating the pre-recorded servo information from this disc surface, the appropriate heads permit a positional error signal ("PES") to be derived. The PES corresponds to head positional error from the intended track center and can permit derivation of track crossing information.

Modern magnetic storage systems tend to use smaller discs whereon a higher density of data is to be reliably recorded and retrieved. Thus, it is not always feasible to dedicate a disc surface for storage of positional data. In these non-dedicated sector servo systems, servo information is recorded interspersed with user data. Using the embedded servo data, the read heads sense the sector over which the heads are positioned. Servo controller system 16 then repositions actuator assembly 10 until the heads are positioned over the desired target track, and sector thereon.

In either type system, positional data are sampled by a read/write head, whereupon servo system 16 outputs positional information including PES. Generally this output positional information drives actuator assembly 10, which repositions the read/write heads (e.g., 12U, 12L) as required. More specifically, a stepper motor or a voice coil mechanism with actuator assembly 10 repositions the heads.

As shown by FIG. 1, servo system 16 generally includes an actuator controller IC 30 that receives input commands from the host computer (not shown). In response, actuator control IC 30 outputs control signals to the actuator assembly 10, which repositions itself accordingly. Typically the actuator controller IC 30 receives DC operating voltage from an external power source via a power series pass unit 32 that is generally in close physical proximity.

FIG. 2 depicts system-level operation of head positioning, and demonstrates the role of the actuator controller IC, which is shown generally as 30. Output from IC 30 is a drive current signal Io that drives the actuator and heads, shown collectively as 10. A read/write head preamplifier 34 detects magnetically encoded data on the adjacent disc surface and couples such data to a demodulator/pulse detector unit 36.

Unit 36 also receives reset and latch signals from a so-called glue chip 28, and outputs digital encoded read data and a positional error signal ("PES"). Glue chip modules are known in the art, and provide control functions that include power-on reset, chip select logic, write fault logic, spindle speed control, dual PWM digital-to-analog converted outputs, as well as embedded servo decode functions.

In FIG. 2, glue chip 28 communicates with a microcontroller unit 22 associated with the servo system, and includes a pulse width modulation ("PWM") digital/analog converter unit 44 and an associated servo data logic unit. Microcontroller unit 22 typically includes an analog/digital converter 24, a microprocessor 26, and various memories 37, 38, and 42. Microprocessor 22 receives the PES, which is digitized for further signal processing.

Upon detecting an encoded servo mark in the data provided by the demodulator pulse detector 36, glue chip 28 generates signals that sequentially reset (e.g., discharge) and then charge capacitors within demodulator 36. These capacitors then latch and hold the corresponding average burst signals, from which the PES information is derived. The glue chip 28 also generates servo interrupt signals for microcontroller unit 22, and sector mark data containing guardband and index information.

As further shown by FIG. 2, PWM data from glue chip 28 is coupled to unit 30, where the data are low-pass filtered by filter 46 and amplified by amplifier 48. The resultant output current Io is coupled to drive the actuator and heads, collectively 10.

It is important that controller IC 30 not overheat while positioning the read/write heads. Such overheating can result in improper output positioning signals, and can also result in permanent damage to IC 30 itself. Understandably, absent a viable controller IC 30, the associated hard disc drive system 2 is useless.

With further reference to FIG. 1, it is known to monitor junction temperature in the power series pass unit 32 that provides DC operating voltage to the controller IC 30. Typically the power series pass unit 32 temperature is monitored by measuring DC voltage across a forward biased emitter-base diode junction in the output stage of unit 32. As is well known in the art, this DC voltage will change as a function of junction temperature, and the voltage change across the diode junction provides a measure of temperature.

In practice, overheating in power supply unit 32 is considered as an indication of imminent overheating within the actuator controller IC 32. Thus, as power unit 32 overheat, it shuts down, which causes a catastrophic shutdown of the actuator controller IC 30. In FIG. 1, this shutdown mechanism is shown generically as a switch S1. However, it is understood that logic circuitry within unit 32 simply disables the operating output voltage provided to IC 30. Because it cannot function without DC operating voltage, IC 30 also shutsdown, and thus does not function in what may be an overheated environment. While the above described procedure can protect actuator controller IC 30 against possible overheating, the resultant IC 30 shutdown is catastrophic. Data in the process of being written to or read from the associated magnetic disc can be lost or corrupted. Further, prolonged IC 30 shutdown is not transparent to the user of the host computer. If power supply unit 32 remains shutdown for too long, it may be necessary for the user of the computer system associated with the hard disk to reboot the system. Finally, it will be appreciated that catastrophic shutdown of actuator controller IC 30 may occur, even if IC 30 were in no imminent danger of overheating.

Alternative approaches to protecting IC 30 against overheating are also known. Those skilled in the art will appreciate that a controller IC can overheat if forced to output a sequence of pulses having too great a duty cycle. To protect against such overheat, one can enforce a maximum duty cycle limitation on the output pulse signals provided by IC 30. U.S. Pat. No. 4,907,108 to Masuyama (1990) provides a delayed-action actuator motor control circuit that reduces load current output to the actuator itself. More specifically, this reference discloses a logic circuit that introduces an additional time delay whenever an actuator controller IC output seek pulse will be followed too closely in time by an adjacent output seek pulse. In this manner, Masuyama's circuit can prevent overheating by preventing excessive output signal duty cycle.

Unfortunately, Masuyama's circuit will impose a maximum limit on the actuator controller IC duty cycle, even if it is not necessary to do so. For example, if the actuator controller IC is in a cold environment, then a duty cycle higher than what Masuyama's circuit will impose can be safely accommodated. Even in a nominal temperature environment, fabrication tolerance spreads can produce an actuator controller IC that can safely accommodate a greater maximum duty cycle than that for which Masuyama's circuit was designed. Stated differently, Masuyama blindly and passively imposes a maximum duty cycle limit and delays the head positioning process without considering whether actual operating conditions require such delay.

In summary, there is a need for a system that will intelligently prevent a hard disc actuator controller IC from operation under extended overheating operating conditions. Such system should monitor actuator controller IC junction temperature and, upon sensing a possible overheating condition, prevent overheating in a non-catastrophic manner. The actuator controller IC should be prevented from operating in overheating conditions in a manner preferably transparent to a user of the associated hard disc drive system. The present invention discloses such a system.

SUMMARY OF THE INVENTION

The present invention provides a method and apparatus for monitoring and reducing junction temperature in the actuator controller IC associated with a hard disc storage system. The present invention provides an actuator controller IC with a junction temperature monitor. When the monitor determines that excessive junction temperature is present, an "EXCESSIVE TEMPERATURE" warning signal is generated. This warning signal is coupled as an input to the microcontroller associated with the servo controller system such that a time delay is imposed between adjacent actuator controller IC output seek pulses. The actuator controller IC is caused to insert this additional time delay, thus reducing duty cycle of the current drive delivered to the read/write head assembly, only when the warning signal is present.

The mechanism for creating the additional time delay may be a circuit and/or software and/or firmware. The mechanism for creating the additional time delay inserts a preferably fixed time duration delay into the output signal from the actuator controller IC, however the duration of the time delay may be sequenced. In a sequenced delay embodiment, initially a relatively small delay is imposed and if the warning signal does not extinguish, a successively longer delay is imposed. When a sufficiently long time delay has been introduced, the actuator controller IC output duty cycle will decrease sufficiently to extinguish the warning signal. Absent the warning signal, no further delay is created.

The present invention introduces the additional delay automatically and continues to insert the delay only as long as actuator controller IC junction temperature is excessively high. As such, the present invention operates transparently to the user, and introduces minimal degradation upon hard disc throughput.

Other features and advantages of the invention will appear from the following description in which the preferred embodiment has been set forth in detail, in conjunction with the accompanying drawings.

DETAILED DESCRIPTION OF THE PREFERRED EMBODIMENT

Figure 2:
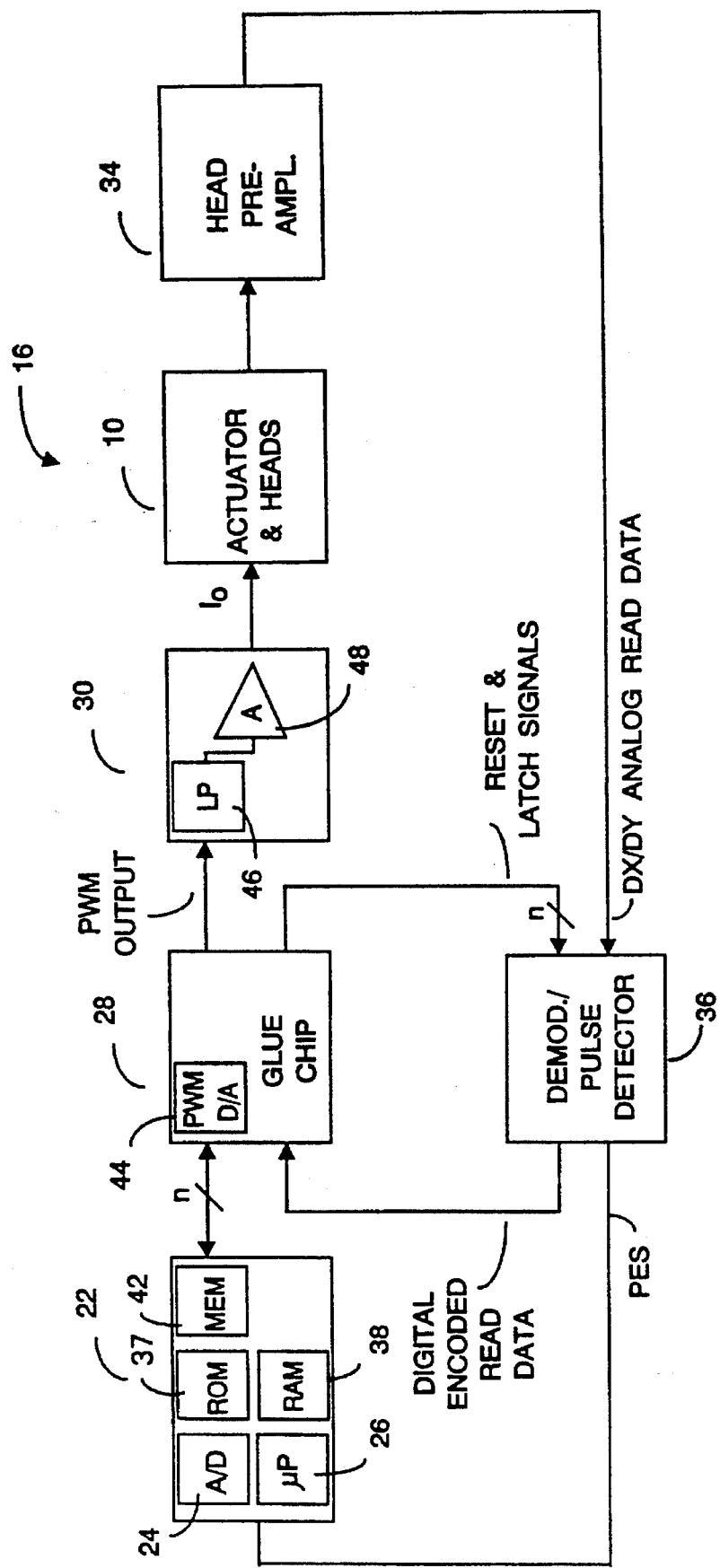
FIG. 2 depicts read/write head positioning in a magnetic disc storage unit under command of an actuator controller IC that is temperature protected, according to the prior art.
Figure 3:
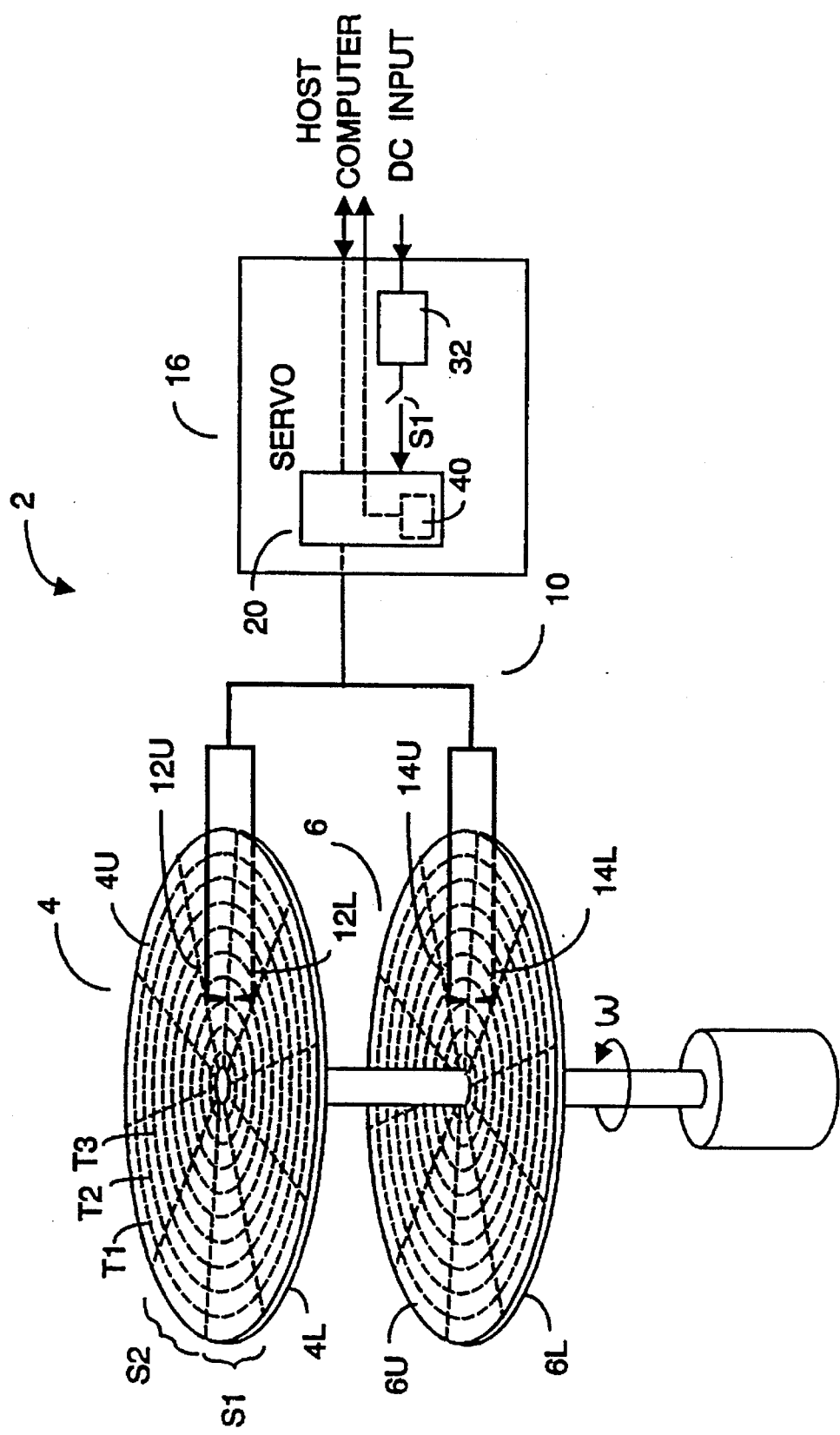
FIG. 3 is a block diagram of hardware implementing a sampled-data read/write head positioning servo system, according to the present invention.

FIG. 3 depicts a block diagram of a portion of a hard disc servo system 16 that includes an actuator controller IC 20 whose junction temperature is monitored and dynamically reduced, according to the present invention. More specifically, junction temperature of IC 20 is monitored by circuitry 40. When the junction temperature exceeds a predetermined safe maximum temperature, circuitry 40 outputs an "EXCESSIVE TEMPERATURE" warning signal that is preferably coupled to the host computer and to a microcontroller unit (e.g., 22 in FIG. 2) associated with the servo system 16. This warning signal may be polled or used to interrupt the servo system microcontroller unit 22 such that the actuator controller IC output signal's duty cycle is dynamically adjusted, as required, to reduce junction temperature, according to the present invention.

Figure 1:
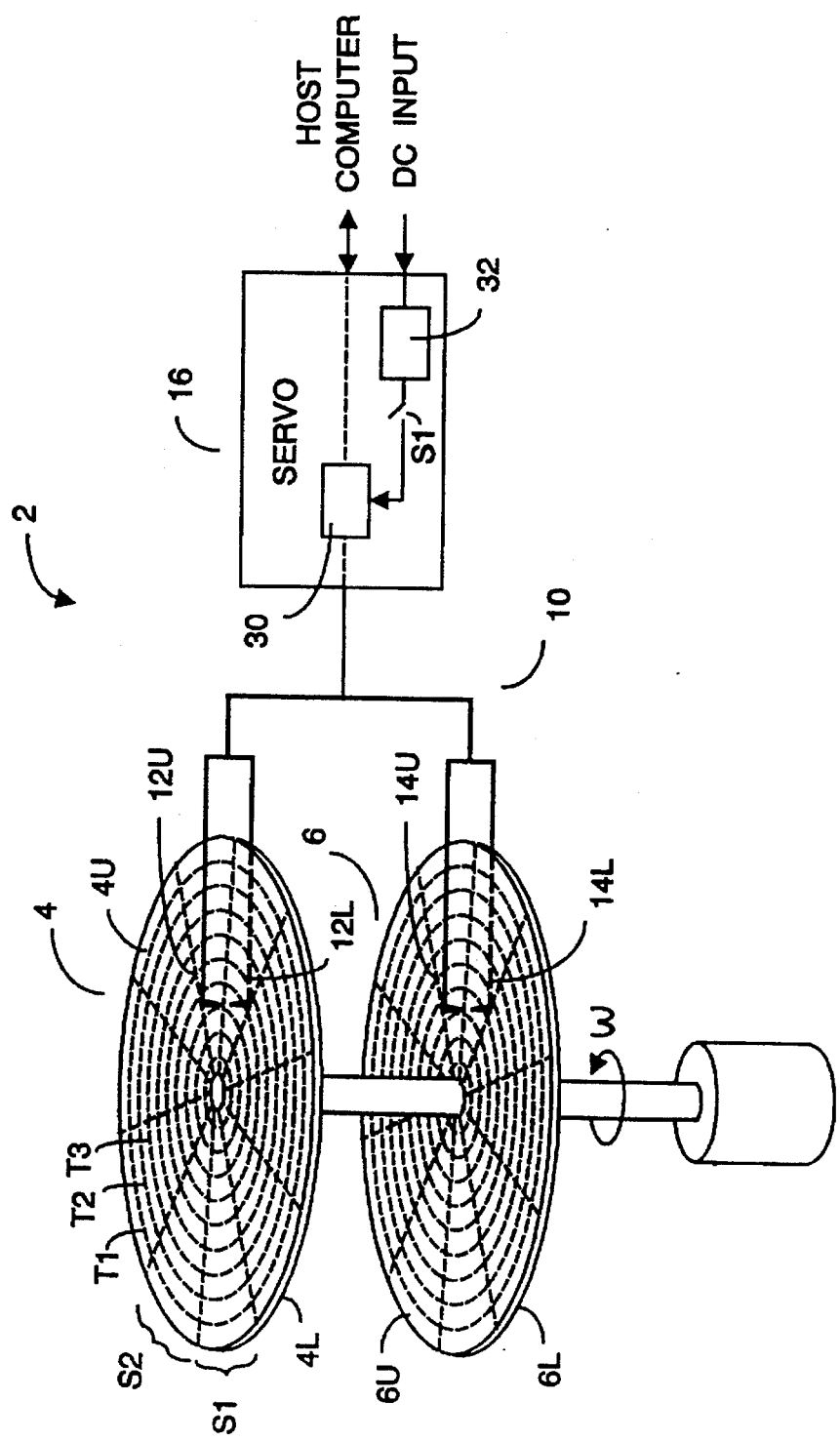
FIG. 1 depicts read/write head positioning in a magnetic disc storage unit under command of an actuator controller IC that is temperature protected, according to the prior art.

As has been described with respect to FIG. 1, a power series pass unit 32, typically in close physical proximity, generally couples DC operating potential to actuator controller IC 20, which potential is disabled when unit 32 overheats. Monitor circuitry 40 preferably is fabricated on the integrated circuit chip whereon actuator controller 20 is fabricated. Alternatively, circuity 40 may be physically adjacent but off-chip, for example on a monolithic structure that contains IC 20.

Figure 4:
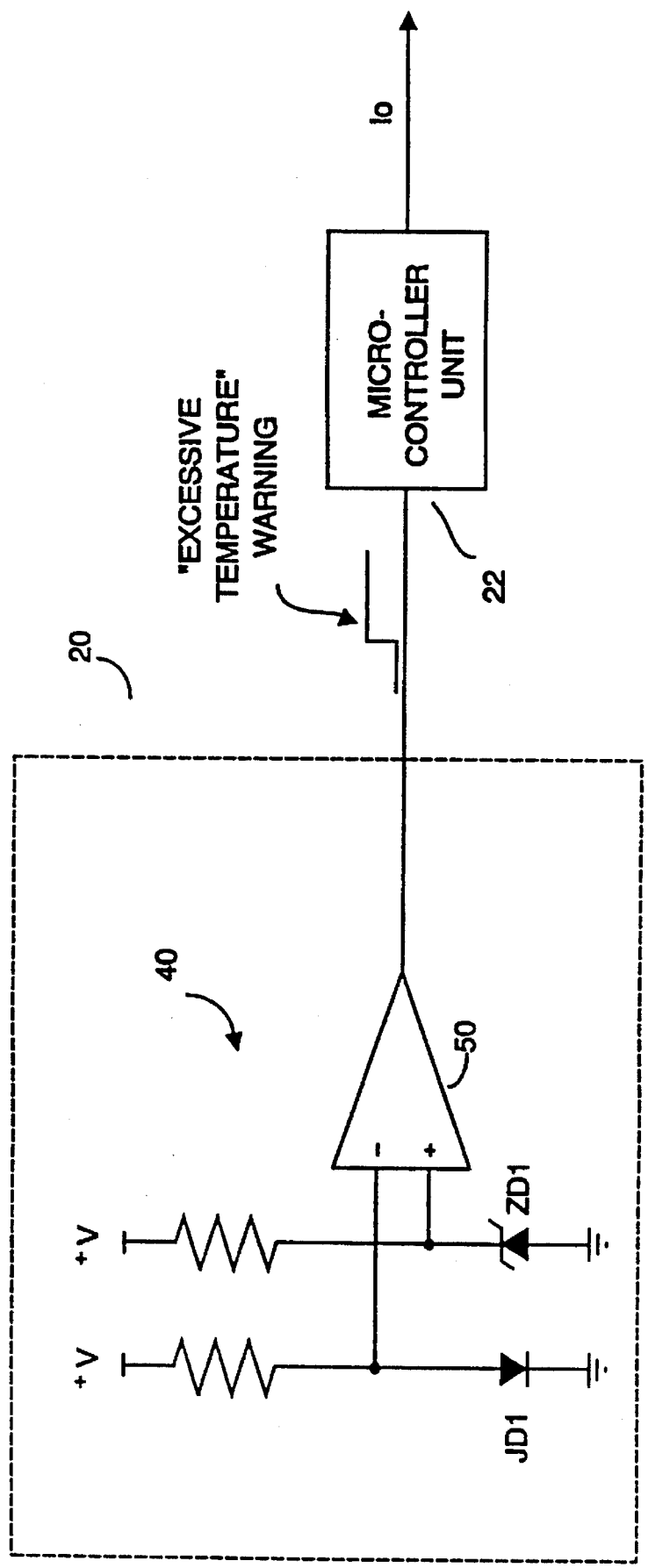
FIG. 4 is a generic schematic of a temperature sense monitor and time delay generation circuit for use with an actuator controller IC, according to the present invention.

FIG. 4 depicts generally one embodiment for monitor circuitry 40. A preferably forward-biased junction diode JD1 is present within IC 20, such JD1 junction temperature is substantially at the same junction temperature as circuitry comprising actuator controller IC 20. Alternatively, JD1 may be off-chip but sufficiently close to IC 20 such that variations in junction temperature of components comprising IC 20 will be manifested by a substantially similar variation in junction temperature associated with JD1.

As junction temperature varies, the DC potential across JD1 varies in a substantially predictable manner. By comparing, e.g., with comparator circuit 50, variations in this DC potential with a DC potential representing a safe reference value for junction temperature, an "EXCESSIVE TEMPERATURE" warning signal may be output by circuit 40 when excessive junction temperature is present or imminently present.

In the simplified embodiment of FIG. 4, a preferably temperature regulated zener reference diode or band gap reference ZD1 provides a substantially constant reference voltage. The voltage associated with ZD1 may be scaled to reflect a magnitude representing a safe junction temperature threshold. In the configuration of FIG. 4, should junction temperature at JD1 increase excessively, voltage comparator 50 will output a "1" signal whose presence signifies an "EXCESS TEMPERATURE" warning.

As noted, FIG. 4 is a simplified schematic, and does not depict Schmidt-trigger type feedback or resistor dividers for voltage magnitude scaling. Further, those skilled in the art will recognize that other circuitry and components may be combined to monitor junction temperature and to generate an excessive temperature warning signal. Without limitation, such methods could include the use of thermistors, temperature-regulated voltage generators, Wheatstone bridge type configurations, current rather than voltage comparisons, and the like.

Specific circuitry for generating a time delay that decreases the duty cycle of the output signals from the actuator controller IC 20 are not presented, as the design of such circuitry is known to those skilled in the art of circuit design. For example, the previously noted U.S. Pat. No. 4,907,108 to Masuyama, provides some elementary time delay circuit diagrams. Similarly, software and/or firmware for generating suitable time delays are known to those skilled in the relevant art, and are not here presented.

Figure 5A:
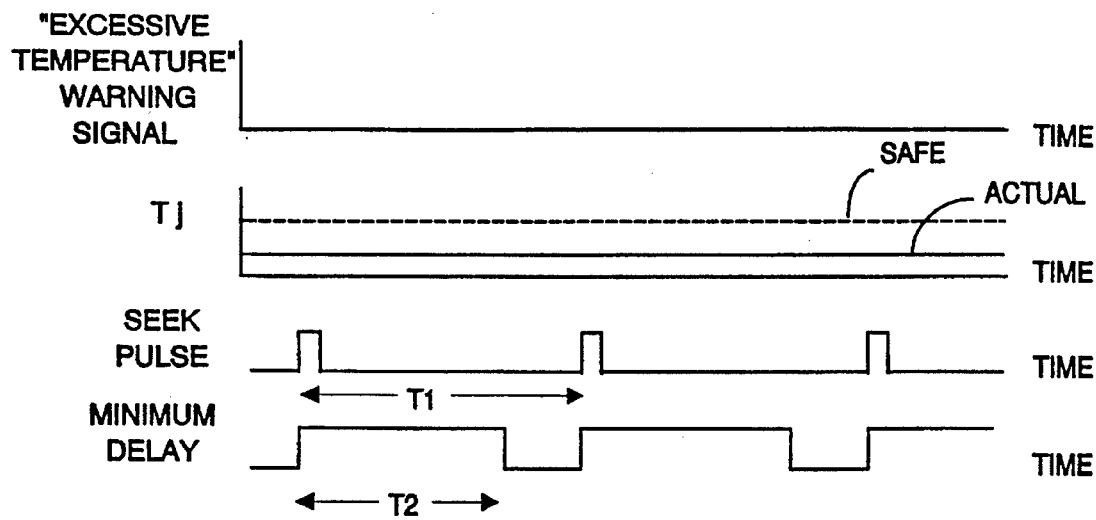
FIG. 5A depicts the case where no warning signal is present, and no duty-cycle lengthening time delay is inserted into the output signals from an actuator controller IC, according to the present invention.

FIG. 5A compares operation of the present invention when excess junction temperature (Tj) is not encountered.

Figure 5B:
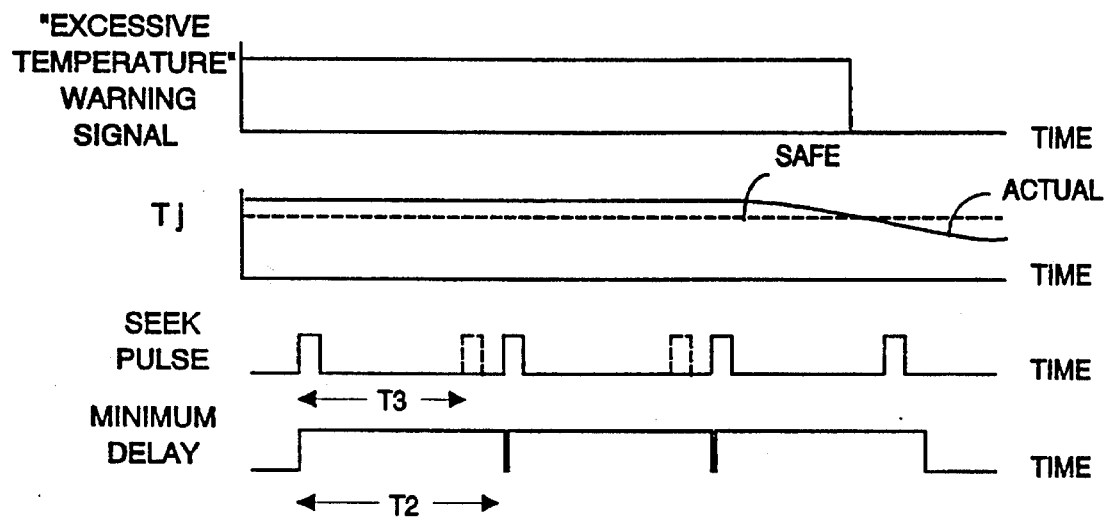
FIG. 5B depicts the case where the warning signal is initially present, whereupon fixed-duration time delays are inserted into the output signals from an actuator controller IC until junction temperature decreases, extinguishing the warning signal, according to the present invention.

As shown therein, the actual magnitude of Tj (which may be in °C. or in mV or mA) is at all times lower (e.g., "safer") than the threshold value, shown as a dashed line. As such, the seek pulse output train from actuator controller IC 20 has a duty cycle wherein adjacent pulses are separated by time T1. In an embodiment wherein a fixed time delay, for example a delay time T2) may be used to extend duty cycle in the output signals from IC 20, no such delay is invoked because the warning signal is "0" e.g., not present By contrast, FIG. 5B depicts the case where initially the warning signal is present, e.g., "1". As shown therein, the warning signal is "1" because initially the actual Tj temperature is higher than the safe threshold value. For the duration wherein the warning signal is present, the present invention will insert a minimum delay between adjacent IC 20 output pulses. In the embodiment of FIG. 5B, this delay is fixed, and has a time duration T2. Thus, whereas the first two seek pulses would normally be separated by a time T3<T2, because the warning signal is "1", the fixed time T2 is inserted. As a result, the seek pulse that would have occurred at time T3 (e.g., the pulse shown in dashed lines) is delayed for time T2. Unlike prior art systems, when IC 20 junction temperature decreases, the warning signal is extinguished (e.g., goes to "0"), and the need to impose further delays no longer exists. Thus, in FIG. 5B, the last two seek pulses are separated by a time T3, since when the warning signal is "0", no delay will be inserted. In practice, the amount of delay required to be inserted may vary from about 0.5 ms to perhaps 2 ms.

Because the present invention operates dynamically in response to actual junction temperature, it can be advantageous to provide a programmably different delay time when excessive junction temperature requires a lengthening of IC 20 duty cycle. For example, in FIG. 5C, initially excessively high junction temperature is present, whereupon an initial delay time T2 is inserted between adjacent seek pulses. Thus, rather than occurring at time T3 after the initial seek pulse, the second seek pulse in FIG. 5C will be separated therefrom by time T2. Since following this second seek pulse, Tj is still too high, a somewhat longer delay time, e.g., T2'>T1, is inserted. As a result, the time separating the second and third seek pulses is T2'. If after this third seek pulse, junction temperature returns to a safe regime, there is no need to impose a time delay between the third and fourth seek pulses. Alternatively, the post-delay may be sequentially reduced in the same sequential manner as were the increases in delay.

Figure 5C:
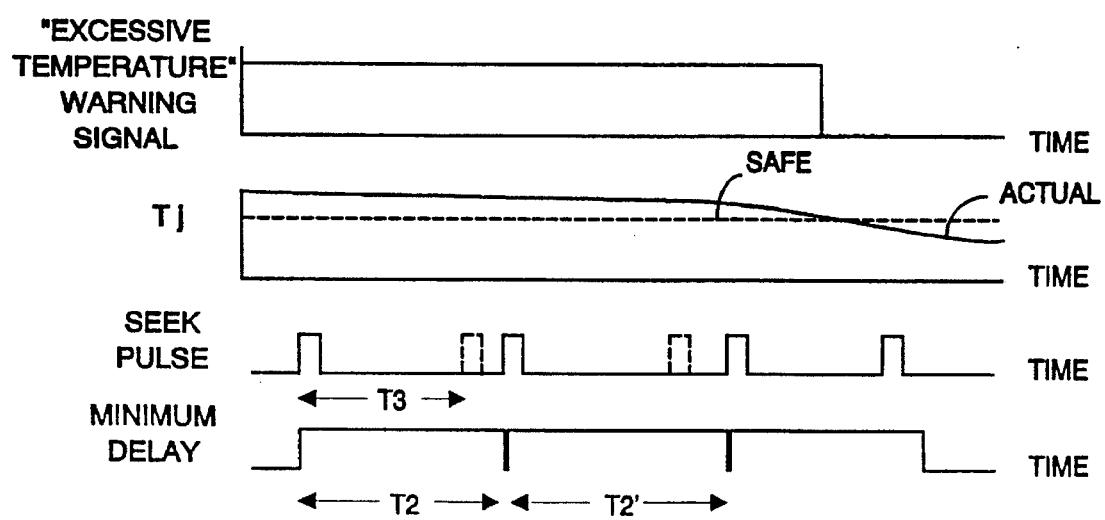
FIG. 5C depicts the case where the warning signal is initially present, whereupon a sequence of progressively longer-duration time delays are inserted into the output signals from an actuator controller IC until junction temperature decreases, extinguishing the warning signal, according to the present invention.

It will be understood that the embodiment depicted in FIG. 5C is simplified. For example, the Tj thermal response may be slower than the time interval between adjacent seek pulses such that even if a safe junction temperature is initially reached, it may be desired to still insert a shorter time delay than the last time delay. This protocol may be invoked to eliminate a mode wherein a slightly safe Tj extinguishes the need for a delaying pulse, but absent any delaying pulse Tj slightly increases, whereupon a delaying pulse is again inserted.

As noted, circuitry, software and/or firmware for generating a sequentially variably time delay is not shown as such techniques are known to those skilled in the relevant arts. A sequence of time delays may be stored in a look-up table, perhaps stored in ROM 30 associated with microcontroller 22 (see FIG. 1). On the first instance of the need for a delay (as indicated by a "0" to "1" warning signal transition), an initial time delay is obtained from ROM 30. Those skilled in the art will appreciate that microcontroller unit 22 may in fact be used to generate the necessary delay pulse itself. If after a predetermined amount of time, Tj still has not dropped to a safe level, the lookup table can program microcontroller unit 22 to output a yet longer time delay. Again, if after a predetermined time Tj still is too high, the lookup table can provide a still longer time delay, and so on.

Similarly, as Tj begins to fall, the look-up table can provide shorter duration pulse delays in an intelligent manner. Because such a look-up table can store pulse width information as desired, adjacent changes in delay need not be of equal time increment.

If desired, the pulse delay could be generated in analog fashion, for example, using a conventional monostable or one-shot, whose time delay output is temporarily stored, for example in a sample and hold that may be digitally implemented. Once a time delay is attained causing Tj to begin to fall, the duration of that time delay can be repeated, or can be decremented such that the next delay is shorter, until a safe Tj is again attained.

Regardless of whether the time delays are fixed in duration, or are varied intelligently, either using digital, analog, or a combination of digital and analog techniques, actuator controller IC junction temperature is intelligently reduced. Because delays are inserted as needed, there is substantially no unnecessary delay that would degrade throughput of the hard disc system with which the present invention is used. Further, junction temperature is reduced intelligently and in an automatic manner transparent to users of the host computer with which the present invention is practiced.

Modifications and variations may be made to the disclosed embodiments without departing from the subject and spirit of the invention as defined by the following claims. For example, while the preferred embodiment has been described with respect to temperature protecting an actuator controller IC that positions read/write heads in a magnetic disc storage system, the present invention may be used to protect ICs in other systems as well.

What is claimed is:

1. A method for temperature protecting an actuator controller integrated circuit that outputs at least one control signal used to position at least one transducer adjacent a rotating disc in a hard disc memory system, the method comprising the following steps:

(a) monitoring temperature of said integrated circuit;

(b) comparing the temperature monitored in step (a) with a reference temperature, and outputting a warning signal while the temperature monitored exceeds the reference temperature by at least a minimum differential; and (c) while said warning signal is present, introducing a variable time delay in said at least one control output signal to dynamically reduce duty cycle of said integrated circuit including a sequence of steps of
      (i) initially imposing a relatively short delay in said duty, cycle of said integrated circuit; and
      (ii) while said warning signal is present, imposing successively longer delays into said duty cycle until said warning signal is diminished or extinguished.

2. The method of claim 1, wherein step (a) includes measuring junction temperature within said integrated circuit.

3. The method of claim 1, wherein step (a) includes measuring DC voltage across a forward-biased diode junction within said integrated circuit to provide a measure of actual junction temperature for said integrated circuit.

4. The method of claim 1, wherein step (a) includes generating a first signal proportional to temperature of said integrated circuit, and wherein step (b) includes generating a second signal proportional to said reference temperature, and further includes coupling said first and second signals as input to a signal comparator whose output is said warning signal.

5. The method of claim 1, wherein at step (c) said time delay varies over the approximate range 0.5 ms to about 2 ms.

6. A system for temperature protecting an actuator controller integrated circuit that outputs at least one control signal used to position at least one transducer adjacent a rotating disc in a hard disc memory system, comprising:

(a) monitoring means for monitoring temperature of said integrated circuit and for providing a first signal proportional to monitored temperature;

(b) comparator means for comparing said first signal with a second signal proportional to a reference temperature, and for outputting a warning signal when a difference between said first and second signals exceeds a predetermined differential;

(c) means for reducing duty cycle of said at least one control signal, said means for reducing having an input coupled to said output of said comparator means and being enabled when said warning signal is present including means for imposing a relatively short delay in said duty cycle of said integrated circuit, and means responsive to continuing presence of said warning signal to impose successively longer delays in said duty cycle.

7. The system of claim 6, wherein said monitoring means includes:

a diode junction within said integrated circuit; and means for monitoring a DC voltage across said diode junction.

8. The system of claim 6, wherein said comparator means includes a signal comparator having a first input coupled to receive a signal representing monitored temperature of said integrated circuit, and having a second input coupled to receive a reference voltage representing a reference temperature;

wherein said signal comparator outputs said warning signal when a differential between signals present at said first and second inputs exceeds a predetermined threshold.

9. The system of claim 6, wherein said means for reducing duty cycle reduces said duty cycle to vary over an approximate range 0.5 ms to about 2 ms when said warning signal is present.

10. The system of claim 6, wherein said means for reducing duty cycle includes an electronic circuit for generating said variable time delay.

11. The system of claim 6, wherein said means for reducing duty cycle includes software for generating said variable time delay.

12. The system of claim 6, wherein said means for reducing said duty cycle includes firmware for establishing said variable time delay.

13. The system of claim 6 wherein said means responsive to presence of said warning signal cease increasing delays in said duty cycle in response to extinction of said warning signal.

* * * * *